United States Patent [19]
Rashkovich et al.

[11] 3,781,619
[45] Dec. 25, 1973

[54] METHOD OF BREAKING ALTERNATING-CURRENT ELECTRIC MOTOR AND DEVICES EMPLOYING THIS METHOD

[76] Inventors: Mikhail Pavlovich Rashkovich, ulitsa Chkalova, 10, kv. 28; Alexandr Ljudvigovich Kon, ulitsa Sverdlova, 95, kv. 1; Nikolai Konstantinovich Shaparev, ulitsa Tereshkovoi, 14, kv. 42; Boris Isaakovich Shklovsky, ulitsa Pushkinskaya, 8, kv. 5; Grigory Abramovich Leibovich, ulitsa Perekopskai Pobedy, 17, kv. 4, all of Odessa, U.S.S.R.

[22] Filed: May 17, 1972

[21] Appl. No.: 254,312

[52] U.S. Cl. ............... 318/211, 318/212, 318/377
[51] Int. Cl. .............................................. H02p 3/20
[58] Field of Search ..... 318/209–212, 370, 371, 377

[56] References Cited
UNITED STATES PATENTS

| 3,678,353 | 7/1972 | Marchi | 318/211 |
| 2,922,097 | 1/1960 | Choudhury | 318/212 |
| 2,637,007 | 4/1953 | Picking et al. | 317/212 |
| 2,514,342 | 7/1950 | Schoenbaum | 318/212 |

OTHER PUBLICATIONS
Kaplan, Lapidus, Diode Short–Circuit Braking Systems for Asynchronous Motors, Machine & Tooling, Vol. 40, No. 12 (1969) 9–11.

*Primary Examiner*—Gene Z. Rubinson
*Attorney*—Eric H. Waters et al.

[57] ABSTRACT

A method of braking an alternating-current electric motor having power windings some of which are deenergized and shorted, while the others are fed with a half-wave rectified current inducing a rotational electromotive force in the shorted power windings.

A device for effecting the method of braking an electric motor according to the invention incorporating a rectifier in the power circuit of the electric motor. Also included into the power circuit of the electric motor are the contacts of an operating starter, said contact being inserted between the motor terminals and the power supply mains. In this case the contact of the braking starter is connected in parallel to the power winding of the electric motor, while the contacts in series with the rectifier are connected parallel to the contacts of the operating starter in the power windings of the motor thus feeding the windings from the power mains through the rectified-current circuit in the process of braking.

4 Claims, 7 Drawing Figures

METHOD OF BREAKING ALTERNATING-CURRENT ELECTRIC MOTOR AND DEVICES EMPLOYING THIS METHOD

The present invention relates to electric drives with alternating-current motors and, more particularly, the invention relates to methods of electric braking of drive motors comprising at least two power windings and to devices for effecting these methods.

The invention can be utilized in machines where from the viewpoint of safety engineering it is necessary to quickly stop movable members, for example, in the main drive of drilling, milling and turning machines, as well as in wood-working and other machines and mechanisms.

Of various methods of braking alternating-current electric motors the most convenient are electric methods which enable this problem to be solved without using additional mechanical devices and provide for automatic control of the process of braking.

The simplest method of electric braking of alternating-current motors is reverse switching of the windings based on a change in the phase sequence of the supply voltage. The braking is controlled by a special speed control relay linked to the motor shaft.

However, such braking is not reliable due to the possibility of rotation of the motor shaft in the opposite direction at failures in the speed control relay, in which case there appear considerable impact forces which are 15 – 20 times as large as the rated torque of the electric motor. Moreover, the provision of a speed control relay in the circuit of the electric motor complicates the construction of the drive.

Known in the art is capacitive braking biased on self-excitation of the motor due to the energy exchange between the deenergized power windings and the capacitors connected to these windings. This braking is advantageous compared to the reverse-switching braking in that it features lower impact forces and eliminates the possibility of rotation of the rotor in the opposite direction.

However, the raise in the dimensions and cost of braking capacitors with the power of a drive motor makes this method of braking economically inexpedient at powers higher than 2 – 5 kwt. The possibility of individual use of capacitor braking is also limited by the absence of a braking moment within the zone of low speeds (in the order of 0.2 – 0.3 of the rated speed of the motor).

The process of braking by shorting an electric motor based on the utilization of the energy of the magnetic field in the short-circuited power windings of the deenergized motor cannot be practically used due to high rate of attenuation of the electromagnetic processes, in which case the braking action is rather short and insufficient for stopping the motor.

Among the best known methods of braking alternating-current electric motors the most promising is dynamic braking effected by means of feeding one or several windings of the motor with a rectified or direct current. This braking is characterized by high smoothness compared with reverse switching, eliminates the possibility of reverse rotation of the motor and provides for a braking moment practically during the whole process of braking.

However, in order to provide for reliable braking of an electric motor, the latter must be fed by a current with a comparatively low content of variable components. When the electric motor in the process of braking is connected to an alternating-current mains through a half-wave rectifier (for example, through a single rectifier), the current flowing through its power windings includes a direct-current component and an alternating-current component with a frequency of the basic harmonic equal to the mains frequency. The direct-current component creates a braking moment, while the alternating-current component produces a torque. In this case the total mechanical characteristic has a motive portion within the range of high speeds. As a result, at low moments of the load the braking is not observed.

This makes it necessary to complicate the rectifying system; to use, for example, full-wave bridge circuits, in which case the dimensions and cost of the braking devices are considerably increased.

In some cases combined systems are employed: capacitor-dynamic braking, capacitor-short circuit braking, and, at last, combination of dynamic braking with reverse switching referred to as double-current braking.

Nevertheless, all these devices have the disadvantages intrisic in the methods therein employed and described above. As a result, particularly in machines with simple electric equipment, the cost and dimensions of the braking device are sometimes higher than the cost of the other electrical appliances of the machine. This fact limits the field of application of the known methods, particularly in metal-working machines of simple modifications.

Thus we have faced the problem of providing a simple, cheap, small-size and, at the same time, efficient and highly reliable device for electric braking of alternating-current motors.

An object of the present invention is to eliminate the disadvantages inherent in the known methods of braking.

Another object of the invention is to provide a simple and effective method of braking alternating-current electric motors and a device for effecting the same.

These and other objects are attained by providing a method of braking an alternating-current electric motor having at least two power windings by means of shorting a part of the deenergized power windings, while the other power windings are fed with a half-wave rectified current incuding a rotational electromotive force in the short circuited windings.

In the device for effecting the proposed method of braking an electric motor one of the contacts of the braking starter is preferably connected in parallel to one of the power windings of the electric motor, while the other contacts thereof are connected in series with a rectifier, and this series circuit is connected in parallel to the contacts of the operating starter in the other power windings of the electric motor thereby providing for feeding these power windings from the mains through a rectified-current circuit in the process of braking.

Another modification of the device for effecting the proposed method of braking electric motors includes a current-limiting resistor connected in series with one of the contacts of the braking starter in the rectified-current circuit.

A step-down transformer may be connected to the rectified-current circuit.

The device for effecting the proposed method of braking is extremely simple and consists of a minimum number of components (one rectifier and one starter). The overall dimensions of the device, as well as its weight and cost are very low, while its efficiency and reliability are high so that very smooth braking is ensured.

The application of the proposed method allows the cost of the device for its realization to be reduced approximately by 70 percent compared with the devices employing dynamic braking and by 90 percent compared with those employing capacitor-dynamic braking, while the overall dimensions are respectively reduced by 80 percent and 90 percent and the weight is reduced by 90 percent. Additional reduction in the cost of the equipment is obtained due to simplifying the mounting and adjustment of the braking devices. The given digital data are obtained taking into account the working characteristics of the industrial electric equipment.

Other objects and advantages of the invention will be apparent from the following detailed description of some embodiments of the invention, reference being made to the accompanying drawings, in which.

In the proposed method of braking an alternating-current electric motor there is used an inductive coupling between its power windings, some of which, when deenergized, are short circuited, while the others are fed with a half-wave rectified current.

Figure 1:
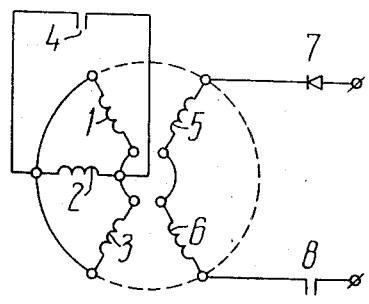
FIGS. 1 and 2 show electric diagrams illustrating the method of braking of an electric motor according to the invention.

To effect the braking according to the proposed method, the stator of a rotating electric motor is disconnected from the alternating-current mains and some of its power windings, for example 1, 2 and 3 (FIG. 1) are short circuited by the contact 4 of a braking starter, while its other power windings, for example 5 and 6 are connected to an alternating-current network through a half-wave rectifier 7 and the contact 8 of the braking starter. Squarrel-cage electric motors are considered as an example. The rotors of the electric motors are not shown in FIGS. 1 to 7.

Figure 2:
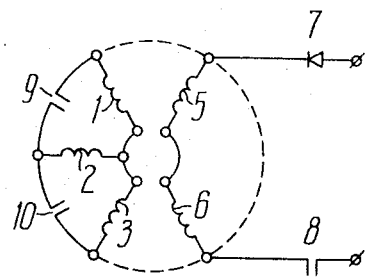

The power windings can also be interbridged through the contacts 9 and 10 of the braking starter as shown in FIG. 2.

Figure 3:
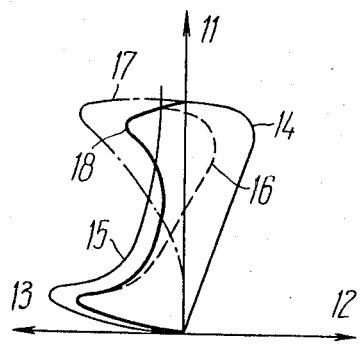
FIG. 3 shows the mechanical braking characteristics of an alternating-current electric motor according to the invention.

FIG. 3 illustrates the principle of operation of the proposed method of braking in the form of mechanical characteristics of the electric motor during its braking.

The motor speed is plotted on the axis 11, the torque of the motor is plotted on the axis 12, while the braking moment is plotted on the axis 13.

The current rectified by the rectifier 7 and flowing through the power windings 5 and 6 of the motor, besides the direct component, contains a significant alternating component. The alternating component produces a turning moment the motor mechanical characteristic of which (curve 14 with no allowance for the moments due to the higher harmonics) is located within the motive quadrant 11 – 12 in FIG. 3.

The direct component produces an effect of dynamic braking whose mechanical characteristic is shown by a curve 15 in FIG. 3 and is lcoated within the braking quadrant 11 – 13.

The resulting mechanical characteristic (curve 16 in FIG. 3) of the electric motor at the open-circuit power windings 1, 2, 3 is determined by the sum of the curves 14 and 15. The shape of the curve 16 depends on the magnitude of critical slipping of the electric motor and the relation between the direct and alternating components, in which case within the zone of near no-load speeds of the electric motor the rotational component of the moment can exceed the braking component. Owing to this fact a portion of the curve 16 is located within the motive quadrant 11 – 12 in FIG. 12; therefore, particularly at low values of the load moment, the connection of the power windings 5 and 6 to the alternating-current power mains through the half-wave rectifier 7 (the remaining power windings 1, 2, 3 are deenergized) may result in an insignificant decrease in the speed of the motor instead of its braking. In the majority of machines such a phenomenon is inadmissible.

Partial or complete shorting of the power windings 1, 2, 3 of the electric motor disconnected in the process of braking results in the appearance of a new effect which, due to the inductive coupling between the power windings 5, 6 and 1, 2, 3, provides for intensive braking of the electric motor at any values of the load, critical slipping, and direct-to-alternating component ratios.

The stator field created by the current flowing through the power windings 5 and 6 induces an electromotive force in the rotating rotor. The rotor field, in its turn, induces a rotational electromotive force in the windings 1, 2, 3 causing therein a current whose magnitude is comparable with the magnitude of the current flowing through the power windings 5 and 6. This current produces a pronounced braking moment which results in a decrease in the motor speed.

The magnitude of the current induced in the shorted windings 1, 2, 3 decreases as fast as the rotor speed drops down. This effect is clearly observed if the resulting vectors of the magnetic field of the power windings 5 and 6 and that of the shorted windings 1, 2, 3 are perpendicular to each other. In this case, when the rotor is at rest, there is no magnetic coupling between the fields, and the current in the power windings 1, 2, 3 is zero. Thus, during the braking of the electric motor by the proposed method its power windigs 1, 2, 3 and 5, 6 behave as there were two inductively connected circuits with a variable coupling coefficient.

The drop of the current in the shorted windings 1, 2, 3 with the speed decreases the braking effect due to the moment created by this current. The dependence of this current on the motor speed is qualitatively shown in FIG. 3 by a curve 17.

However, the braking moment due to gradual alternating component of the current in the power windings 5 and 6 increases simultaneously with a decrease in the rotational moment caused by the same component. The resulting mechanical characteristic curve 18 of the electric motor during its braking by the proposed method is determined by the sum of curves 16 and 17 and lies to the full extent within the braking quadrant 11 – 13 in FIG. 3. As a result, a reliable high-intensity braking of the electric motor is obtained.

The braking of the electric motor due to interconnecting its power windings 1, 2, 3 through the contacts 9 and 10 of the braking starter (FIG. 2) is effected similarly to the above-described process.

As an example of realization of the proposed method, given below are a number of electric diagrams of the devices for braking a single-phase and double-phase induction motors.

Figure 4:
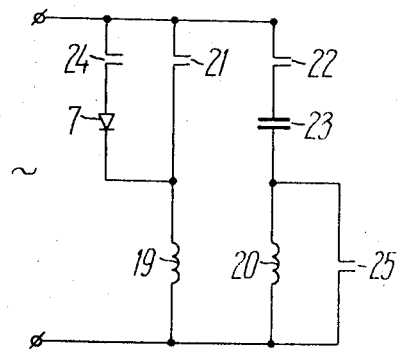
FIG. 4 shows an electric diagram of the device for effecting the method of braking a single-phase induction capacitor motor, according to the invention.

FIG. 4 shows an electric diagram of the device for effecting the method of braking a single-phase capacitor induction motor.

The power windings 19 and 20 of the stator of the motor are connected to the alternating-current power mains through the contacts 21 and 22 of the operating starter. To provide for a time shift between the voltages feeding the separate power windings, the power winding 20 is connected to the mains through a phase-shifting capacitor 23. During the braking the power windings are commutated through the contacts 24 and 25 of a braking starter. A rectifier 7 is connected in series with the contact 24.

For braking the electric motor the operating starter is disconnected by opening its contacts 21 and 22, and the braking starter is switched on. The contact 25 of the braking starter shorts the power windings 20 of the electric motor, while the contact 24 of the braking starter together with the rectifier 7 form a rectified-current circuit of the power winding 19 of the electric motor.

Figure 5:
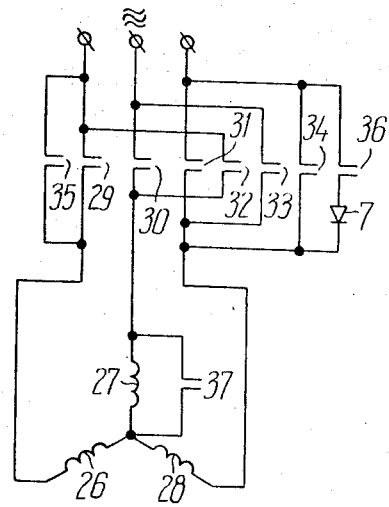
FIG. 5 shows an electric diagram of the device for effecting the method of braking a three-phase induction motor, according to the invention.

FIG. 5 shows an electric diagram of the device for effecting the method of braking of a three-phase induction motor.

The power windings 26, 27 and 28 of the stator of the induction motor are connected to the alternating-current power mains through the contacts 29, 30, 31 or the contacts 32, 33, 34 of the operating starter depending on the direction of rotation. The braking starter with contacts 35, 36, 37 and the rectifier 7 are used for braking the motor.

When braking the motor, its operating starter is disconnected by opening the contacts 29 – 31 or 32 – 34 and the braking starter is switched on. The contact 37 of the braking starter shorts the winding 27 of the motor, while the contacts 35 and 36 and the rectivier 7 form a rectified-current circuit of seriesly connected windings 26 and 28.

The processes occuring in the devices whose electric diagram is shown in FIG. 4 are identical to the those described above.

The resulting vectors of the magnetic fields of the power windings 19 and 20 of a single-phase capacitor electric motor shown in FIG. 4, the power winding 27 and two seriesly connected power windings 26 and 28 of a three-phase electric motor shown in FIG. 5 are mutually perpendicular. When the rotor is at rest the magnetic coupling between the corresponding power windings 19 – 20 and 26 – 27, 28 of the electric motors is therefore absent. Any deviation of the rotor from the state of rest results in that in the shorted power winding (power windings 20 in FIG. 4 and 27 in FIG. 5) there appears a current which creates a moment opposing the motion. Thus, the shorted power windings 20 and 27 also create a damping effect reducing vibrations.

Where it is necessary to limit the currents of the electric motor in the process of its braking, a non-controllable rectifier is used in combination with a current-limiting resistor or a step-down transformer. A controlled rectifier can be used for the same purpose.

Figure 6:
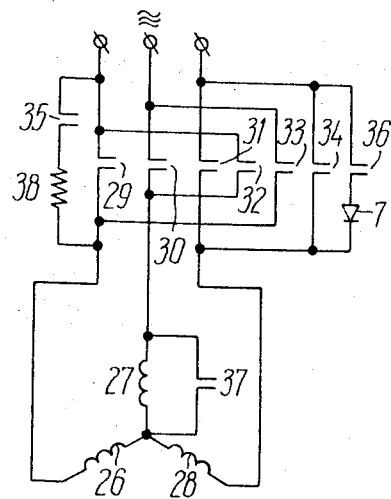
FIG. 6 shows an electric diagram of the device for effecting the method of braking a three phase induction motor having a current-limiting resistor inserted into the rectified-current circuit, according to the invention.

Thus, FIG. 6 shows an electric diagram of the device for effecting the proposed method of braking a three-phase induction motor in which in the circuit of the contact 35 of the braking starter is inserted a current-limiting resistor 38 to limit the currents in the seriesly connected power windings 26 and 28. In all other respects the electric diagram in FIG. 6 is fully identical to that in FIG. 5.

Figure 7:
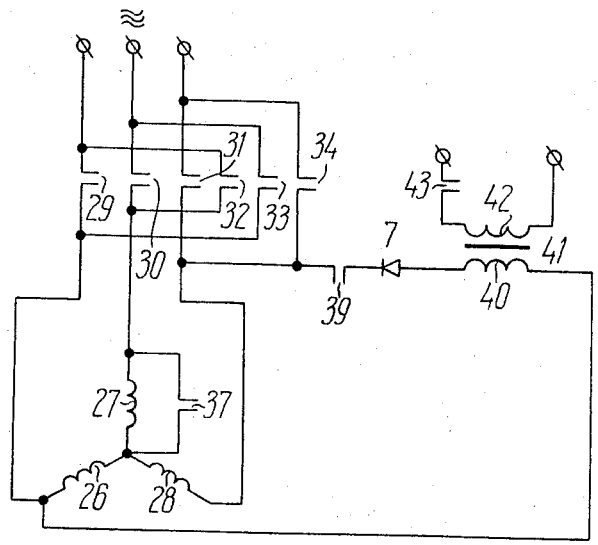
FIG. 7 shows an electric diagram of the device for effecting the method of braking a three-phase induction motor, a step-down transformer being connected to the rectified-current circuit, according to the invention.

FIG. 7 shows a diagram of the device for effecting the method of braking a three-phase induction motor in which the seriesly connected power winding 26 and 28 are connected to the secondary winding of a step-down transformer 41 through the contact 39 of the braking starter to reduce the currents flowing through these windings. The primary winding 42 of the step-down transformer is connected to the alternating-current mains through the contact 43 of the braking starter.

By properly selecting the values of the current-limiting resistor 38 in FIG. 6 or the voltage of the secondary winding 40 of the step-down transformer 41 (FIG. 7), one can reduce the current flowing through the power windings 26 and 28 to a required magnitude.

The current flowing through the power windings 26 and 28 in the device whose electric diagram is illustrated in FIG. 5 can be controlled by a controllable rectifier inserted into the circuit instead of the rectifier 7.

The above-described examples of effecting the method according to the invention do not limit the scope of the devices based on the proposed method. Thus, the current-limiting resistor and step-down transformer can be used also in the circuits of the devices for effecting the method of braking a single-phase capacitor electric motor in FIG. 4. The proposed method can also be used in the case of connection of the power windings 26, 27 and 28 of a three-phase electric motor into a delta system. In this case one of the power windings of the motor is shorted through the contact of the braking starter, while the two other windings are connected in parallel into the a-c mains through a rectifier. At last, it is possible to use rectifiers feeding a portion of the power windings of the electric motor by a current having a low alternating component, for example, full-wave rectifiers. In this case the shorting of a portion of the power windings of the electric motor is also a very effective measure since it increases the braking moment within the zone of high speeds.

The braking devices for effecting the proposed method of braking can be employed at any industrial enterprise including those having no skilled personnel, because such devices need no servicing or adjustment in the process of operation.

The experiments have shown that in drilling machines and lathes the proposed method of braking allows for realization of simple and highly reliable devices for braking the spindle which are characterized by low cost and overall dimensions, and therefore this method can be used in all cases where it is necessary to meet strict requirements with respect to the small size, weight and minimum cost of the equipment; not only in mechanical engineering, but in other branches of industry; chemical, textile, etc.

We claim:

1. A device for braking an alternating-current electric motor having at least two power windings comprising in combination: a motor power circuit connected to the terminals of the motor, power means supplying current to said power circuit, a rectifier inserted into said power circuit, an operating starter having contacts connected into said power circuit between the terminals of the motor and the power mains, a braking starter having a first contact connected in parallel to one of the power windings of the motor in said power circuit, and a second contact connected in series with said rectifier and connected in parallel with the contacts of the operating starter in the other power windings of the motor so as to supply current to these windings from the mains through the rectified-current circuit during the process of braking.

2. A device as claimed in claim 1, comprising a current-limiting resistor connected in series with one of said contacts of the braking starter in the rectified-current circuit.

3. A device as claimed in claim 1, comprising a step-down transformer connected to the rectified-current circuit.

4. A method of braking an alternating-current motor having at least two power windings; comprising connecting a first one of said power windings in parallel to a braking starter for said motor; connecting the second one of said power windings in series to a rectifier; deenergizing and short-circuiting at least a portion of one of said power windings, and concurrently supplying the other of said power windings with a half-wave rectified current so as to induce a rotational electromotive force in the short-circuited windings adapted to impart a braking force to said motor.

* * * * *